United States Patent
Yamaguchi

(10) Patent No.: US 7,544,422 B2
(45) Date of Patent: Jun. 9, 2009

(54) LAMINATE

(75) Inventor: Masayuki Yamaguchi, Nomi (JP)

(73) Assignee: Tosoh Corporation, Yamaguchi (JP)

( * ) Notice: Subject to any disclaimer, the term of this patent is extended or adjusted under 35 U.S.C. 154(b) by 711 days.

(21) Appl. No.: 11/192,007

(22) Filed: Jul. 29, 2005

(65) Prior Publication Data

US 2006/0024519 A1 Feb. 2, 2006

(30) Foreign Application Priority Data

Jul. 30, 2004 (JP) ............ P. 2004-224373

(51) Int. Cl.
  *B32B 27/08* (2006.01)
  *B32B 27/32* (2006.01)
(52) U.S. Cl. .............. 428/500; 428/511; 428/512; 428/513; 428/515; 428/516; 428/523
(58) Field of Classification Search ........ 428/511, 428/512, 513, 516, 523, 500, 515
See application file for complete search history.

(56) References Cited

U.S. PATENT DOCUMENTS

| 5,272,236 | A | | 12/1993 | Lai et al. | |
|---|---|---|---|---|---|
| 5,567,488 | A | * | 10/1996 | Allen et al. | ........ 428/34.1 |
| 5,942,579 | A | | 8/1999 | Falla et al. | |
| 2003/0065097 | A1 | | 4/2003 | DeGroot et al. | |
| 2003/0088037 | A1 | | 5/2003 | Stevens et al. | |
| 2003/0120003 | A1 | * | 6/2003 | Kashiwa et al. | ........ 526/114 |

FOREIGN PATENT DOCUMENTS

| EP | 1 241 194 A1 | 9/2002 |
|---|---|---|
| EP | 1 473 323 A1 | 11/2004 |
| JP | 6-65443 A | 3/1994 |
| JP | 6-322189 A | 11/1994 |
| JP | 7-92610 A | 4/1995 |
| JP | 2000-73018 A | 3/2000 |
| WO | WO 95/01250 A | 1/1995 |
| WO | WO 96/16119 A | 5/1996 |
| WO | WO 98/46674 A | 10/1998 |
| WO | WO 2005/023912 A | 3/2005 |

OTHER PUBLICATIONS

European Search Report dated Nov. 10, 2005.
J.P. Hogan et al., "Melt Elasticity in Linear PE Containing Long Branches" (1967), SPE Journal, vol. 23, pp. 87-90.

* cited by examiner

*Primary Examiner*—D. S Nakarani
(74) *Attorney, Agent, or Firm*—Sughrue Mion, PLLC

(57) ABSTRACT

A laminate comprising, as at least one layer, a polyethylene resin layer that can be extrusion lamination molded, and satisfying the following requirements (A) to (D):

(A) a density is 0.890-0.980 g/cm³;
(B) the number of long chain branches having 6 or more carbon atoms is 0.01-3 per 1,000 carbon atoms;
(C) a melt tension (mN) measured at 190° C. ($MS_{190}$) and MFR (melt flow rate: g/10 min, 190° C.) under a load of 2.16 kg are satisfied with the following formula (1):

$$MS_{190} > 22 \times MFR^{-0.88} \qquad (1)$$

and a melt tension (mN) measured at 160° C. ($MS_{160}$) and MFR (melt flow rate: g/10 min, 190° C.) under a load of 2.16 kg are satisfied with the following formula (2):

$$MS_{160} > 110 - 110 \times \log(MFR) \qquad (2)$$

(D) an endothermic curve obtained in temperature-rise measurement by a differential scanning calorimeter shows one peak.

7 Claims, No Drawings

LAMINATE

FIELD OF THE INVENTION

The present invention relates to a laminate comprising a polyethylene resin layer as at least one layer.

BACKGROUND ART

Of laminates obtained by extrusion lamination processing, a laminate comprising a polyethylene resin layer as at least one layer is used in wide use fields such as kraft package, flexible package, photographic support papers, tapes or various packages. Conventionally, a polyethylene resin used in those laminates has mainly been a branched low density polyethylene (hereinafter referred to as "LDPE" for brevity) due to its excellent molding processability. However, the density of LDPE is generally 0.918-0.925 g/cm$^3$, and it is difficult to change physical properties that change together with the density, such as beat resistance, rigidity or gas barrier property. Thus, there has been restriction in using LDPE. On the other hand, a linear polyethylene such as a linear low density polyethylene (hereinafter referred to as "L-LDPE" for brevity") or a linear high density polyethylene (hereinafter referred to as "LDPE" for brevity) can widely change its density according to the number of short chain branches. However, due to poor molding processability, it was difficult to obtain a laminate by extrusion laminate processing. In view of this circumstance, a method of obtaining a laminate by extrusion lamination processing a mixture of a linear polyethylene and LDPE was frequently used, as described in, for example, JP 6-65443A, JP 6-322189A, JP 7-92610A or JP 2000-73018A. However, this method gave rise to the problems on stability of product quality that because a mixing step of a polyethylene resin is required, cost performance of a laminate is poor; thermal deterioration causes in the mixing step of a polyethylene resin, and as a result, odor is liable to generate; and due to poor mixing of polymers, surface appearance of a laminate is poor. In particular, where a laminate is required to have heat resistance, rigidity, gas barrier property and easy disaggregation property, use of a polyethylene having high density, i.e., HDPE, is desired. However, LDPE must be mixed in order to improve molding processability, and this makes the density of the resulting mixture low, compared with HDPE alone. As a result, it was difficult to obtain a laminate having excellent heat resistance, rigidity, gas barrier property and easy disaggregation property. The term "easy disaggregation property" used herein means the property that a laminate having a paper as one layer is finely pulverized in a pulper. This property is strongly demanded in a moisture-proof paper having a resin such as polyethylene coated thereon.

Technologies are reported that long chain branches are introduced into L-LDPE or HDPE by changing a polymerization catalyst of ethylene, thereby increasing molding processability. However, melt tension of polyethylene resins obtained using those technologies are still insufficient, and LDPE had to be mixed, as disclosed in, for example, U.S. Pat. No. 5,272,236 and J. P. Hogan, et al., SPE J., vol. 23, p. 87 (1967).

SUMMARY OF THE INVENTION

The present invention has been made to overcome the above-described prior art problems.

Accordingly, an object of the present invention is to provide a laminate comprising, as at least one layer, an ethylene resin layer capable of being subjected to extrusion lamination processing, without mixing LDPE.

The present invention has been completed as a result of extensive investigations to achieve the above object.

The present invention provides a laminate comprising, as at least one layer, a polyethylene resin layer that can be extrusion lamination molded, and satisfying the following requirements (A) to (D):

(A) a density is 0.890-0.980 g/cm$^3$;

(B) the number of long chain branches having 6 or more carbon atoms is 0.01-3 per 1,000 carbon atoms;

(C) a melt tension (mN) measured at 190° C. ($MS_{190}$) and MFR (melt flow rate: g/10 min, 190° C.) under a load of 2.16 kg are satisfied with the following formula (1):

$$MS_{190} > 22 \times MFR^{-0.08} \qquad (1)$$

and a melt tension (mN) measured at 160° C. ($MS_{160}$) and MFR (melt flow rate: g/10 min, 190° C.) under a load of 2.16 kg are satisfied with the following formula (2):

$$MS_{160} > 110 - 110 \times \log(MFR) \qquad (2)$$

(D) an endothermic curve obtained in temperature-rise measurement by a differential scanning calorimeter shows one peak.

DETAILED DESCRIPTION OF THE INVENTION

The present invention is described in detail below.

The polyethylene resin used as at least one layer constituting the laminate of the present invention has a density of 0.890-0.980 g/cm$^3$ in terms of a value measured by a density gradient tube method according to JIS K6760 (1995). Where the density is lower than 0.890 g/cm$^3$, there is the possibility that heat resistance of a laminate obtained is extremely poor, and where the density exceeds 0.980 g/cm$^3$, there is the possibility that curl of a laminate obtained is remarkable. Further, when the laminate is used in use fields requiring heat resistance, resistance to water vapor permeability and rigidity, such as heat-resistant packages, gas barrier packages, release tapes and papers, photographic support papers or easy disaggregating moisture-proof papers, the polyethylene resin desirably has a density of 0.950-0.980 g/cm$^3$.

The polyethylene resin used as at least one layer constituting the laminate of the present invention has a weight average molecular weight (Mw) of 10,000-1,000,000, preferably 20,000-700,000, more preferably 25,000-300,000, in terms of a linear polyethylene conversion. Where Mw is lower than 10,000 or exceeds 1,000,000, it is extremely difficult to conduct extrusion lamination molding, and there is the possibility that a laminate is not obtained.

The polyethylene resin used as at least one layer constituting the laminate of the present invention has an MFR at 190° C. under a load of 2.16 kg of 0.1-200 g/10 min, preferably 1-150 g/10 min, more preferably 5.5-120 g/10 min. Where the MFR is lower than 0.1 g/10 min or exceeds 200 g/10 min, it is extremely difficult to conduct extrusion lamination molding, and there is the possibility that a laminate is not obtained. Where the laminate is used as an easy disaggregating moisture-proof paper, the MFR is preferably 30-120 g/10 min from the point of improvement of a disaggregation property.

The polyethylene resin used as at least one layer constituting the laminate of the present invention has the number of long chain branches of 0.01-3 per 1,000 carbon atoms. Where the number is lower than 0.01, it is extremely difficult to conduct extrusion lamination molding, and there is the possibility that a laminate is not obtained. On the other hand, where the number exceeds 3, there is the possibility that such a polyethylene resin layer gives a laminate having poor mechanical properties. The term "the number of long chain branches" used herein means the number of branches of hexyl groups or more (carbon atoms: 6 or more) detected by $^{13}$C-NMR measurement.

The polyethylene resin used as at least one layer constituting the laminate of the present invention has the relationship represented by the following formula (1), preferably (1)', more preferably (1)", between a melt tension $MS_{190}$ (mN) measured at 190° C. and MFR (g/10 min, 190° C.):

$$S_{190} > 22 \times MFR^{-0.88} \tag{1}$$

$$MS_{190} > 30 \times MFR^{-0.88} \tag{1}'$$

$$MS_{190} > 5 + 30 \times MFR^{0.88} \tag{1}''$$

Where the formula (1) is not satisfied, it is extremely difficult to conduct extrusion lamination molding, and there is the possibility that a laminate is not obtained.

Further, the polyethylene resin used as at least one layer constituting the laminate of the present invention has the relationship represented by the following formula (2), preferably (2)', more preferably (2)", between a melt tension $MS_{160}$ (mN) measured at 160° C. and MFR (g/10 min, 190° C.):

$$MS_{160} > 110 - 110 \times \log(MFR) \tag{2}$$

$$MS_{160} > 130 - 110 \times \log(MFR) \tag{2}'$$

$$MS_{160} > 150 - 110 \times \log(MFR) \tag{2}''$$

Where the formula (2) is not satisfied, it is extremely difficult to conduct extrusion lamination molding, and there is the possibility that a laminate is not obtained.

The polyethylene resin used as at least one layer constituting the laminate of the present invention has the characteristic that an endothermic curve obtained in temperature-rise measurement by a differential scanning calorimeter (DSC) shows one peak. The laminate having this characteristic has small temperature dependency of elastic modulus, and has excellent heat resistance. The endothermic curve is obtained by filling 5-10 mg of a sample in an aluminum-made pan, and rising temperature by DSC. The temperature-rise measurement is conduct that after previously allowing the pan containing a sample to stand at 230° C. for 3 minutes, the temperature is lowered to −10° C. at a temperature-lowering rate of 10° C./min, and then the temperature is elevated to 150° C. at a temperature-rising rate of 10° C./min.

The polyethylene resin used as at least one layer constituting the laminate of the present invention preferably has a shrinkage factor (g' value) evaluated by gel permeation chromatography (GPC)/intrinsic viscometer of 0.1 to less than 0.9, preferably 0.1-0.7. By having the property in this range, neck-in can be minimized in extrusion lamination processing the polyethylene resin, thereby improving the yield of a laminate obtained. The term "shrinkage factor (g' value)" used herein means a parameter showing the degree of long chain branches, and is a ratio of an intrinsic viscosity of a polyethylene resin in an absolute molecular weight three times a weight average molecular weight (Mw) to an intrinsic viscosity in the same molecular weight of HDPE having no branch. There is the relationship as shown in the following formula (3), preferably (3)', between the g' value and a shrinkage factor (g value) evaluated by GPC/light scattering equipment, and by this relationship, the yield of a laminate is further improved. The "g value" is a ratio of a square average of radius of gyration of an ethylene resin in an absolute molecular weight three times Mw to a square average of radius of gyration in the same molecular weight of HDPE having no branch.

$$0.2 < \log(g')/\log(g) < 1.3 \tag{3}$$

$$0.5 < \log(g')/\log(g) < 1.0 \tag{3}'$$

Further, it is desirable for improvement of the yield of a laminate that there is the relationship as shown in the following formula (4), preferably (4)', more preferably (4)", between the g value ($g_{3M}$) in an absolute molecular weight three times Mw and the g value ($g_M$) in an absolute molecular weight one time Mw:

$$0 < g_{3M}/g_M \leq 1 \tag{4}$$

$$0 < g_{3M}/g_M \leq 0.9 \tag{4}'$$

$$0 < g_{3M}/g_M \leq 0.8 \tag{4}''$$

The polyethylene resin used as at least one layer constituting the laminate of the present invention preferably is a polyethylene having terminal vinyl groups obtained by polymerizing ethylene, or a copolymer having terminal vinyl groups obtained by copolymerizing ethylene and an olefin having 3 or more carbon atoms. The polyethylene or copolymer is obtained by polymerizing ethylene and optionally an olefin having 3 or more carbon atoms in the presence of a macromonomer having the following requirements:

(E) a number average molecular weight (Mn) is 2,000 or higher, and (F) Mw/Mn is 2-5.

The term "macromonomer" used herein means a polyolefin having terminal vinyl groups, and is preferably a polymer having terminal vinyl groups obtained by polymerizing ethylene, or a copolymer having terminal vinyl groups obtained by copolymerizing ethylene and an olefin having 3 or more carbon atoms. More preferable macromonomer is a linear polyethylene or a linear copolymer, each having terminal vinyl groups, wherein of branches other than branches originated from an olefin having 3 or more carbon atoms, short chain branches such as methyl branch, ethyl branch, propyl branch, butyl branch and pentyl branch are less than 0.01 per 1,000 main chain methylene carbons, and long chain branches (i.e., branches of hexyl group or more detected by $^{13}$C-NMR measurement) are less than 0.01 per 1,000 main chain methylene carbons.

Examples of the olefin having 3 or more carbon atoms include α-olefin such as propylene, 1-butene, 1-hexene, 1-octene, 4-methyl-1-pentene, 3-methyl-1-butene or vinyl cycloalkane, cyclic olefins such as norbornene or norbornadiene, dienes such as butadiene or 1,4-hexadiene, and styrene. Those olefins can be used alone or as mixtures of two or more thereof.

Where an ethylene polymer having terminal vinyl groups, or an ethylene copolymer having terminal vinyl groups, is used as a macromonomer, the macromonomer has a number average molecular weight (Mn) in terms of a linear polyethylene conversion of 2,000 or more, preferably 5,000 or more, more preferably 10,000, and also has a weight average molecular weight (Mw) in terms of a linear polyethylene conversion of 4,000 or more, preferably 10,000 or more, more preferably 15,000 or more. Ratio of a weight average molecular weight (Mw) to a number average molecular weight (Mn), i.e., Mw/Mn, is 2-5, preferably 2-4, and more preferably 2-3.5. The amount of the terminal vinyl groups per mol of the macromonomer is determined by converting the amount of the terminal vinyl groups per 1,000 carbon atoms measured by IR to the amount per Mn, and is 0.1-1 mol, preferably 0.5-1 mol, more preferably 0.8-1 mol.

The polyethylene resin used as at least one layer constituting the laminate of the present invention can contain the conventional additives such as antioxidants, weathering stabilizers, antistatic additives, antifogging additives, blocking additives, slipping additives, lubricants, nucleating additives, inorganic fillers or reinforcing additives (e.g., pigments, tackifiers, carbon black, talc, glass powder or glass fibers), organic fillers or reinforcing additives, flame retardants, or neutron shielding additives. Further, the polyethylene resin can be used in combination with other thermoplastic resins. Examples of the other thermoplastic resin include tackifiers, waxes, HDPE, L-LDPE, LDPE, polypropylene, poly-1-butene, poly-4-methyl-1-pentene, ethylene/vinyl acetate copolymer, ethylene/vinyl alcohol copolymer, polystyrene, and maleic anhydride graft product of those.

The laminate of the present invention is obtained by laminating or coating the polyethylene resin which forms at least one layer, on various substrates by extrusion lamination molding method. The extrusion lamination molding method can use any of single lamination, tandem lamination, coextrusion lamination, and sandwich lamination, and is not particularly limited. In conducting extrusion lamination processing, the polyethylene resin is preferably extruded from a die at a temperature of 250-350° C. in order to obtain a laminate having good adhesion between the polyethylene resin layer and the substrate. The face at which a molten film of the polyethylene resin contacts at least the substrate may be oxidized with air or ozone. In case of proceeding oxidation reaction with air, the polyethylene resin is preferably extruded from a die at a temperature of 270° C. or higher, and in case of proceeding oxidation reaction with ozone gas, the polyethylene resin is preferably extruded from a die at a temperature of 250° C. or higher. The amount of ozone gas used is preferably 0.5 mg or more per 1 $m^2$ of a film extruded from a die. To increase adhesion of the polyethylene resin to the substrate, the conventional surface treatment such as anchor coat treatment, corona discharge treatment, flame treatment or plasma treatment may be applied to the adhesion surface of the substrate. Examples of the substrate include synthetic high molecular weight polymer films or sheets, woven fabrics, non-woven fabrics, metal foils, papers and cellophanes. The synthetic high molecular weight polymer films or sheets are, for example, films or sheets comprising a synthetic high molecular weight polymer such as polyethylene terephthalate, polyamide, polyvinyl alcohol, polycarbonate, polyethylene or polypropylene. Those high molecular weight polymer films or sheets may be deposited with aluminum, alumina or silicon dioxide. Further, those high molecular weight polymer films or sheets may be printed using, for example, urethane inks. Examples of the metal foils include aluminum foil and copper foil. Examples of the papers include kraft paper, stretched paper, high quality paper, glassine paper, cup base paper, and paperboard such as base paper for photographic paper.

The laminate of the present invention can widely be used as films, packages, tapes or supports, such as packaging laminate films for dry foods (e.g., snack foods or instant noodles) or liquid eating and drinking foods (e.g., soups, miso (soybean paste), package laminate films for medicines (e.g., drugs or infusion bags), toiletry goods (e.g., shampoo, cosmetics or back sheets of diapers), photographic support papers, paper packages and cups, paper dishes, release papers and tapes, easy disaggregation film and paper semi-retort packs. In particular, the laminate obtained by extrusion lamination processing a polyethylene resin having a density of 0.950-0.980 $g/cm^3$ is preferably used as heat-resistant packages, gas-barrier packages, release papers or sheets, photographic support papers, or easy disaggregating moisture-proof papers. The laminate obtained by using a polyethylene resin having MFR of 30-120 g/10 min and a density of 0.950-0.980 $g/cm^3$ is preferably used as easy disaggregating moisture-proof papers.

The laminate having the number of pinholes of 5 or less in visual observation after allowing the laminate to stand under an atmosphere at 135° C. for 30 seconds, applying a methylene blue solution to the laminate and then wiping off the solution has excellent heat resistance, and is therefore preferably used.

The laminate in which a polyethylene resin layer obtained by dipping the laminate in an alkali aqueous solution for 24 hours and then separating the polyethylene resin layer from the laminate has an elongation at break of 30% or less measured under the conditions of sample width: 15 mm and tensile speed: 50 mm/min has excellent easy disaggregation property, and is therefore preferably used.

The laminate of the present invention enables heat resistance, gas-barrier property and rigidity to optionally change by merely changing a density of a polyethylene resin used, and can be produced by extrusion lamination processing without mixing two kinds or more of polyethylene resins. Therefore, the laminate has excellent cost performance and quality stability.

The present invention is described in more detail by reference to the following Examples, but it should be understood that the invention is not construed as being limited thereto.

Preparation of modified hectorite, preparation of catalyst for macromonomer production, production of macromonomer, production of polyethylene and solvent refining were all conducted under inert gas atmosphere. Solvents used in preparation of modified hectorite, preparation of catalyst for macromonomer production, production of macromonomer, and production of polyethylene were all previously refined, dried and deoxidized by the conventional methods. Diphenylmethylene(1-indenyl)(9-fluorenyl)zirconium dichloride, and diphenylmethylene(1-cyclopentadienyl)(2,7-di-t-butyl-9-fluorenyl)zirconium dichloride were synthesized and identified by the conventional methods. Zirconium dichloride used was a product of Wako Pure Chemical Industries, Ltd. Hexane solution of triisobutyl aluminum (0.714M), toluene solution of methyl alumoxane (trade name: PMAO; Al: 2.4 mol/liter) and toluene solution of triisobutyl aluminum (0.848M) used were products of Tosoh Finechem Corporation.

Properties of polyethylene resins in the Examples and Comparative Examples were measured by the following methods.

Molecular Weight and Molecular Weight Distribution

Weight average molecular weight (Mw) and number average molecular weight (Mn) were measured by gel permeation chromatography (GPC). GPC device used was HLC-8121GPC/HT, a product of Tosoh Corporation, and a column used was TSKgel GMHhr-H(20)HT, a product of Tosoh Corporation. Column temperature was set to 140° C., and 1,2,4-trichlorobenzene was used as an elutriant for measurement. Measurement sample was prepared in a concentration of 0.1 mg/ml, and injected in an amount of 0.3 ml for measurement. Calibration curve of molecular weight is corrected using a polystyrene sample having a known molecular weight. Mw and Mn were determined as values of linear polyethylene conversion.

Shrinkage Factor (g' Value)

Shrinkage factor (g' value) is a value obtained by dividing [η] in an absolute molecular weight three times Mw determined with the method measuring [η] of polyethylene fractionated by GPC by [η] in the same molecular weight of HDPE having no branches. GPC device used was HLC-8121GPC/HT, a product of Tosoh Corporation, and a column used was TSKgel GMHhr-H(20)HT, a product of Tosoh Corporation. Column temperature was set to 145° C., and 1,2,4-trichlorobenzene was used as an elutriant for measurement. Measurement sample was prepared in a concentration of 0.1 mg/ml, and poured in an amount of 0.3 ml for measurement. Viscometer used was a capillary differential pressure viscometer 210R+, a product of Viscotek Corporation.

Shrinkage Factor (g Value)

Shrinkage factor (g value) was determined with a method of measuring radius of gyration of a polyethylene fractionated by GPC with light scattering. The shrinkage factor (g value) is a value obtained by dividing a square average of radius of gyration of an ethylene resin used for the polyethylene resin layer constituting the laminate of the present invention in an absolute molecular weight three times Mw by a square average of radius of gyration in the same molecular weight of HDPE having no branch. Light scattering detector used was a multi-angle light scattering detector DAWV EOS, a product of Wyatt Technology, and measurement was made at detection angles of 29.50°, 33.3°, 39.0°, 44.8°, 50.7°, 57.5°, 64.4°, 72.3°, 81.1°, 90.0°, 98.9°, 107.7°, 116.6°, 125.4°, 133.2°, 140.0° and 145.8° with a wavelength of 690 nm.

Density

Density was measured with a density gradient tube method according to JIS K6760 (1995).

MFR

MFR was measured at 190° C. under a load of 2.16 kg according to JIS K6760 (1995).

Number of Long Chain Branch

The number of long chain branch was measured by $^{13}C$-NMR using a nucleus magnetic resonance instrument, Model JNM-GSX270, a product of JEOL Co.

Melt Tension (MS)

Polyethylene used for measurement of a melt tension (MS) was prepared by adding, as antioxidant, 1,500 ppm of IRGANOX 1010™ (a product of Ciba Specialty Chemicals) and 1,500 ppm of IRGFOS 168™ (a product of Ciba Specialty Chemicals) to a polyethylene and kneading the resulting mixture at 190° C. at the number of revolution of 30 rpm under nitrogen stream for 3 minutes using an internal mixer (trade name: Labo Plast Mill, a product of Toyo Seiki Seisaku-Sho, Ltd.). Melt tension (MS) was measured by mounting a die having a length (L) of 8 mm, a diameter (D) of 2.095 mm and an entrance angle of 90° to a capillary viscometer having a barrel diameter of 9.55 mm (trade name: Capillograph, a product of Toyo Seiki Seisaku-Sho, Ltd.). MS is a load (mN) required for take-off when temperature is set to 160° C. or 190° C., piston lowering rate is set to 10 mm/min, and stretching ratio is set to 47.

Number of Endothermic Peak

The number of endothermic peak was measured using DSC (trade name: DSC-7, a product of Perkin Elmer Co.) 5-10 mg of sample was placed on an aluminum pan, and the pan was mounted to DSC. Temperature was elevated to 230° C. at a temperature rising rate of 80° C./min, and the sample was allowed to stand at 230° C. for 3 minutes. The sample was cooled to −10° C. at a temperature lowering rate 10° C./min, and the temperature was again elevated from −10° C. to 150° C. at a temperature rising rate of 10° C./min. Thus, temperature rising/temperature lowering operations were conducted, and the number of peaks on an endothermic curve observed at a second temperature elevation was evaluated.

Heat-resistant Pinhole

A laminate was allowed to stand in a small-size oven (a product of Werner Mathis AG) set to 135° C. for 30 seconds, and then taken out of the oven. A methylene blue solution was applied to the heat-treated laminate, and then wiped out. Surface of the laminate after wiping off the methylene blue solution was visually observed, and the number of pinholes generated was counted.

Easy Disaggregation Property

A laminate was dipped in an alkali aqueous solution for twenty-four hours to remove a paper. The laminate was subjected to a tensile test in machine direction. A tensile tester used was Autograph DCS500 (trade name, a product of Shimadzu Co.). Sample width was 15 mm, tensile speed was 50 mm/min, and elongation at break was measured. Smaller the elongation at break, the better the disaggregation property.

EXAMPLE 1

Preparation of Modified Hectorite 60 ml of ethanol and 2.0 ml of 37% concentrated hydrochloric acid were added to 60 ml of water. 11.7 g (0.022 mol) of N-methyl dioleylamine was added to the solution obtained, and the resulting solution was heated to 60° C. to prepare N-methyl dioleylamine hydrochloride solution. 20 g of hectorite was added to the solution. The resulting suspension was stirred at 60° C. for 3 hours, and a supernatant was removed. The suspension was washed with 1 liter of water at 60° C., dried at 60° C. under $10^{-3}$ torr for 24 hours, and ground with a jet mill to obtain modified hectorite having an average particle diameter of 5.2 μm. As a result of elemental analysis, amount of ions per 1 g of the modified hectorite was 0.85 mmol.

Preparation of Catalyst for Macromonomer Production 8.0 g of the modified hectorite obtained above was suspended in 29 ml of hexane. 46 ml (0.714 M) of a hexane solution of triisobutylaluminum was added to the resulting suspension, and the resulting mixture was stirred at room temperature for 1 hour to obtain a catalytic product of modified hectorite and triisobutylaluminum. On the other hand, a solution obtained by adding 14.0 mg (40 μmol) of dimethylsilanediylbis(cyclopentadienyl)zirconium dichloride to toluene was added to the suspension, and the resulting mixture was stirred at room temperature overnight to obtain a catalyst slurry (100 g/liter).

Production of Macromonomer 6,000 ml of hexane and 12 ml of a hexane solution (0.714 mol/l) of triisobutylaluminum were introduced in a 10 liters autoclave. Inner temperature of the autoclave was elevated to 85° C. 3 ml of the catalyst slurry obtained above was introduced into the autoclave, and ethylene was then introduced into the autoclave until an ethylene partial pressure reaches 1.2 MPa to initiate polymerization. During the polymerization, ethylene was continuously introduced into the autoclave so as to maintain the partial pressure at 1.2 MPa. Polymerization temperature was controlled to 85° C. After 53 minutes from initiation of polymerization, the inner temperature was lowered to 50° C. to reduce inner pressure of the autoclave to 0.1 MPa, and nitrogen was introduced into the autoclave until reaching 0.6 MPa, followed by pressure reduction. This operation was repeated 5 times. Macromonomer taken out of the autoclave had Mn of 10,950 and Mw/Mn of 2.61. As a result of analyzing a terminal structure of the macromonomer by $^{13}$C-NMR, a ratio (Z) of the number of vinyl terminals to the number of saturated terminals was 0.57. Further, 0.52 per 1,000 carbon atoms of methyl branches and 1.22 per 1,000 carbon atoms of ethyl branches were detected in $^{13}$C-NMR. Long chain branch was not detected in $^{13}$C-NMR.

Production of Polyethylene 12 ml of a hexane solution (0.714 mol/l) of triisobutylaluminum and 60 μmol of diphenylmethylene(1-indenyl)(9-fluorenyl)zirconium chloride were introduced into a 10 liters autoclave containing the macromonomer obtained above. Inner temperature of the autoclave was elevated to 85° C. Ethylene/hydrogen mixed gas (hydrogen: 28,500 ppm) was introduced into the autoclave until its partial pressure reaches 0.2 MPa to initiate polymerization. During the polymerization, the ethylene/hydrogen mixed gas was continuously introduced into the autoclave so as to maintain the partial pressure at 0.2 MPa. Polymerization temperature was controlled to 85° C. After 95 minutes from initiation of polymerization, the inner pressure of the autoclave was reduced, and the contents were suction filtered. After drying, 978 g of a polymer was obtained. The polyethylene thus obtained had MFR of 13.6 g/10 min, density of 0.960 g/cm$^3$, Mw of 6.7× 10$^4$, Mw/Mn of 5.2, and the number of long chain branches of 0.03/1,000 carbons. Other properties of the polymer obtained are shown in Tables 1 to 3 below.

The polyethylene obtained above was subjected to extrusion lamination molding using 25 mm small size uniaxial laminator (Placo Co.) at a resin temperature of 320° C. in a thickness of 20 μm. Substrates used were kraft paper and high quality paper. Line speed was 20 m/min and air gap was 80 mm. Where high quality paper was used, polyethylene was applied to a back surface of the paper in addition of the front surface thereof in the same manner. Thickness of polyethylene on the back surface was 50 μm.

Using a laminate of high quality paper obtained above, heat resistant pinhole property was measured. Separately, disaggregation property was evaluated using a laminate of kraft paper. The results obtained are shown in Table 4 below. The number of pinholes generated was small, thus showing excellent heat resistance, and tensile elongation at break was small, thus showing excellent easy disaggregation property.

EXAMPLE 2

Preparation of Modified Hectorite 60 ml of ethanol and 2.0 ml of 37% concentrated hydrochloric acid were added to 60 ml of water. 7.78 g (0.022 mol) of N,N-dimethyl behenylamine was added to the solution obtained, and the resulting solution was heated to 60° C. to prepare N,N-dimethyl behenylamine hydrochloride solution. 20 g of hectorite was added to the solution. The resulting suspension was stirred at 60° C. for 3 hours, and a supernatant was removed. The suspension was washed with 1 liter of water at 60° C., dried at 60° C. under 10$^{-3}$ torr for 24 hours, and ground with a jet mill to obtain modified hectorite having an average particle diameter of 5.2 μm. As a result of elemental analysis, amount of ions per 1 g of the modified hectorite was 0.85 mmol.

Preparation of Catalyst for Macromonomer Production 8.0 g of the modified hectorite obtained above was suspended in 29 ml of hexane. 46 ml (0.714 M) of a hexane solution of triisobutylaluminum was added to the resulting suspension, and the resulting mixture was stirred at room temperature for 1 hour to obtain a catalytic product of modified hectorite and triisobutylaluminum. On the other hand, a solution obtained by adding 18.9 mg (40 μmol) of diphenylsilanediylbis(cyclopentadienyl)zirconium dichloride to toluene was added to the suspension, and the resulting mixture was stirred at room temperature overnight to obtain a catalyst slurry (100 g/liter).

Production of Macromonomer 6,000 ml of hexane and 5.0 ml of a hexane solution (0.714 mol/l) of triisobutylaluminum were introduced in a 10 liters autoclave. Inner temperature of the autoclave was elevated to 85° C. 0.88 ml of the catalyst slurry obtained above was introduced into the autoclave, and ethylene was then introduced into the autoclave until an ethylene partial pressure reaches 1.2 MPa to initiate polymerization. During the polymerization, ethylene was continuously introduced into the autoclave so as to maintain the partial pressure at 1.2 MPa. Polymerization temperature was controlled to 85° C. After 90 minutes from initiation of polymerization, the inner temperature was lowered to 50° C. to reduce inner pressure of the autoclave to 0.1 MPa, and nitrogen was introduced into the autoclave until reaching 0.6 MPa, followed by pressure reduction. This operation was repeated 5 times. Macromonomer taken out of the autoclave had Mn of 14,400 and Mw/Mn of 3.02. As a result of analyzing a terminal structure of the macromonomer by $^{13}$C-NMR, a ratio (Z) of the number of vinyl terminals to the number of saturated terminals was 0.65. Further, 0.41 per 1,000 carbon atoms of methyl branches and 0.96 per 1,000 carbon atoms of ethyl branches were detected in $^{13}$C-NMR. Long chain branch was not detected in $^{13}$C-NMR.

Production of Polyethylene 1.4 ml of a hexane solution (0.714 mol/l) of triisobutylaluminum and 7 μmol of diphenylmethylene(1-cyclopentadienyl)(2,7-di-t-butyl-9-fluorenyl)zirconium chloride were introduced into a 10 liters autoclave containing the macromonomer obtained above. Inner temperature of the autoclave was elevated to 90° C. Ethylene/hydrogen mixed gas (hydrogen: 3,600 ppm) was introduced into the autoclave until its partial pressure reaches 0.3 MPa to initiate polymerization. During the polymerization, the ethylene/hydrogen mixed gas was continuously introduced into the autoclave so as to maintain the partial pressure at 0.3 MPa. Polymerization temperature was controlled to 90° C. After 40 minutes from initiation of polymerization, the inner pressure of the autoclave was reduced, and the contents were suction filtered. After drying, 650 g of a polymer was obtained. The polyethylene thus obtained had MFR of 14.8 g/10 min, density of 0.958 g/cm$^3$, Mw of 7.7×10$^4$, Mw/Mn of 6.2, and the number of long chain branches of 0.03/1,000 carbons. Other properties of the polymer obtained are shown in Tables 1 to 3 below.

Using the polyethylene obtained above, a laminate was produced in the same manner as in Example 1, and heat resistant pinhole property and tensile elongation at break were measured. The results obtained are shown in Table 4 below. The number of pinholes generated was small, thus showing excellent heat resistance, and tensile elongation at break was small, thus showing excellent easy disaggregation property.

EXAMPLE 3

Production of Macromonomer 6,000 ml of hexane and 5.0 ml of a hexane solution (0.714 mol/l) of triisobutylaluminum were introduced in a 10 liters autoclave. Inner temperature of the autoclave was elevated to 90° C. 25 ml of the catalyst slurry obtained in preparation of catalyst for macromonomer production in Example 1 was introduced into the autoclave, and ethylene was then introduced into the autoclave until an ethylene partial pressure reaches 1.2 MPa to initiate polymerization. During the polymerization, ethylene was continuously introduced into the autoclave so as to maintain the partial pressure at 1.2 MPa. Polymerization temperature was controlled to 90° C. After 16 minutes from initiation of polymerization, the inner temperature was lowered to 50° C. to reduce inner pressure of the autoclave to 0.1 MPa, and nitrogen was introduced into the autoclave until reaching 0.6 MPa, followed by pressure reduction. This operation was repeated 5 times. Macromonomer taken out of the autoclave had Mn of 9,600 and Mw/Mn of 2.30. As a result of analyzing a terminal structure of the macromonomer by $^{13}$C-NMR, a ratio (Z) of the number of vinyl terminals to the number of saturated terminals was 0.57. Further, 0.52 per 1,000 carbon atoms of methyl branches and 1.22 per 1,000 carbon atoms of ethyl branches were detected in $^{13}$C-NMR. Long chain branch was not detected in $^{13}$C-NMR.

Production of Polyethylene 5 ml of a hexane solution (0.714 mol/l) of triisobutylaluminum and 50 μmol of diphenylmethylene(1-fluorenyl)(9-fluorenyl)zirconium chloride were introduced into a 10 liters autoclave containing the macromonomer obtained above. Inner temperature of the autoclave was elevated to 85° C. Ethylene was introduced into the autoclave until its partial pressure reaches 0.1 MPa to initiate polymerization. During the polymerization, ethylene was continuously introduced into the autoclave so as to maintain the partial pressure at 0.1 MPa. Polymerization temperature was controlled to 85° C. After 180 minutes from initiation of polymerization, the inner pressure of the autoclave was reduced, and the contents were suction filtered. After drying, 805 g of a polymer was obtained. The polyethylene thus obtained had MFR of 52.5 g/10 min, density of 0.972 g/cm$^3$, Mw of 4.1×10$^4$, Mw/Mn of 3.7, and the number of long chain branches of 0.03/1,000 carbons. Other physical properties of the polymer obtained are shown in Tables 1 to 3 below.

Using the polyethylene obtained above, a laminate was produced in the same manner as in Example 1, and heat resistant pinhole property and tensile elongation at break were measured. The results obtained are shown in Table 4 below. The number of pinholes generated was small, thus showing excellent heat resistance, and tensile elongation at break was small, thus showing excellent easy disaggregation property.

COMPARATIVE EXAMPLE 1

Using a commercially available high density polyethylene (trade name: NIPOLONHARD #2000, a product of Tosoh Corporation, MFR=15 g/10 min, density: 0.960 g/cm$^3$), extrusion lamination molding was attempted in the same manner as in Example 1, but a molten film was not stable, and a laminate could not be obtained.

COMPARATIVE EXAMPLE 2

50 wt % of a commercially available low density polyethylene (trade name: PETROTHENE 203, a product of Tosoh Corporation, MFR=8 g/10 min, density: 0.919 g/cm$^3$) was mixed with a commercially available high density polyethylene (trade name: NIPOLONHARD #2500, a product of Tosoh Corporation, MFR=8 g/10 min, density: 0.961 g/cm$^3$), and using the resulting mixture having a density of 0.940 g/cm$^3$, extrusion lamination molding was conducted in the same manner as in Example 1 to obtain a laminate. Heat resistant pinhole property and tensile elongation at break of the laminate obtained were measured. The results obtained are shown in Table 4 below. The number of pinholes generated was large, thus showing poor heat resistance, and tensile elongation at break was large, thus showing poor easy disaggregation property.

COMPARATIVE EXAMPLE 3

Using a commercially available low density polyethylene (trade name: PETROTHENE 203, a product of Tosoh Corporation, MFR=8 g/10 min, density: 0.919 g/cm$^3$), extrusion lamination molding was conducted in the same manner as in Example 1 to obtain a laminate. Heat resistant pinhole property and tensile elongation at break of the laminate obtained were measured. The results obtained are shown in Table 4 below. The number of pinholes generated was large, thus showing poor heat resistance, and tensile elongation at break was large, thus showing poor easy disaggregation property.

COMPARATIVE EXAMPLE 4

Using a commercially available metallocene type linear low density polyethylene (trade name: AFFINITY PT1450, a product of Dow Chemical Co., MFR=7.5 g/10 min, density: 0.902 g/cm$^3$), extrusion lamination molding was conducted in the same manner as in Example 1 to obtain a laminate. Heat resistant pinhole property and tensile elongation at break of the laminate obtained were measured. The results obtained are shown in Table 4 below. The number of pinholes generated was large, thus showing poor heat resistance, and tensile elongation at break was large, thus showing poor easy disaggregation property.

TABLE 1

(Melt tension at 190° C.)

| | MS$_{190}$ (mN) | Right side of Formula (1) | Right side of Formula (1)' | Right side of Formula (1)'' |
|---|---|---|---|---|
| Example 1 | 30 | 2.2 | 3.0 | 8.0 |
| Example 2 | 15 | 1.1 | 1.5 | 6.5 |
| Example 3 | 15 | 0.7 | 1.0 | 6.0 |
| Comparative Example 1 | <5 | 2.0 | 2.8 | 7.8 |
| Comparative Example 2 | 30 | 3.5 | 4.8 | 9.8 |
| Comparative Example 3 | 50 | 3.5 | 4.8 | 9.8 |
| Comparative Example 4 | 10 | 3.7 | 5.6 | 10.6 |

TABLE 2

(Melt tension at 160° C.)

| | MS$_{160}$ (mN) | Right side of Formula (2) | Right side of Formula (2)' | Right side of Formula (2)'' |
|---|---|---|---|---|
| Example 1 | 55 | <0 | 5.3 | 25.3 |
| Example 2 | 30 | <0 | 1.2 | 21.2 |
| Example 3 | 25 | <0 | <0 | <0 |
| Comparative Example 1 | 10 | <0 | 0.6 | 20.6 |
| Comparative Example 2 | 50 | 10.7 | 30.7 | 50.7 |
| Comparative Example 3 | 105 | 10.7 | 30.7 | 50.7 |
| Comparative Example 4 | 20 | 13.7 | 33.7 | 53.7 |

TABLE 3

(Dilute solution properties and number or long chain branch)

| | g' | log (g')/log (g) | $g_{3M}/g_M$ | Number of long chain branch (/1,000 carbon) |
|---|---|---|---|---|
| Example 1 | 0.43 | 0.8 | 0.7 | 0.03 |
| Example 2 | 0.41 | 0.8 | 0.7 | 0.03 |
| Example 3 | 0.39 | 0.7 | 0.6 | 0.03 |
| Comparative Example 1 | 1.0 | — | 1.0 | <0.01 |
| Comparative Example 2 | 0.72 | 0.9 | 0.9 | 2 |
| Comparative Example 3 | 0.40 | 1.3 | 0.7 | 4 |
| Comparative Example 4 | 0.80 | 1.0 | 1.2 | >10 |

TABLE 4

(Number of endothermic peak, heat resistant pinhole and tensile elongation at break)

| | Number of endothermic peak | Number of pinhole generated (/100 cm²) | Tensile elongation at break (%) |
|---|---|---|---|
| Example 1 | 1 | 0 | 10 |
| Example 2 | 1 | 0 | 10 |
| Example 3 | 1 | 0 | <5 |
| Comparative Example 1 | 1 | *1 | *1 |
| Comparative Example 2 | 2 | 53 | 150 |
| Comparative Example 3 | 1 | 97 | 120 |
| Comparative Example 4 | 1 | >100 | 390 |

*1: Because laminate processing was impossible, a laminate was not obtained.

It should further be apparent to those skilled in the art that various changes in form and detail of the invention as shown and described above may be made. It is intended that such changes be included within the spirit and scope of tile claims appended hereto.

This application is based on Japanese Patent Application No. 2004-224373 filed Jul. 30, 2004, the disclosure of which is incorporated herein by reference in its entirety.

What is claimed is:

1. A laminate comprising, as at least one layer, a polyethylene resin layer that can be extrusion lamination molded, which polyethylene resin layer is laminated on a substrate, and satisfies the following requirements (A) to (D):
   (A) a density is 0.890-0.980 g/cm³;
   (B) the number of long chain branches having 6 or more carbon atoms is 0.01-3 per 1,000 carbon atoms;
   (C) a melt tension (mN) measured at 190° C. ($MS_{190}$) and MFR (melt flow rate: g/10 min, 190° C.) under a load of 2.16 kg satisfy the following formula (1):

$$MS_{190} > 22 \times MFR^{-0.88} \quad (1)$$

and a melt tension (mN) measured at 160° C. ($MS_{160}$) and MFR (melt flow rate: g/10 min, 190° C.) under a load of 2.16 kg satisfy the following formula (2):

$$MS_{160} > 110 - 110 \times \log(MFR) \quad (2)$$

(D) an endothermic curve obtained in temperature-rise measurement by a differential scanning calorimeter shows one peak.

2. The laminate as claimed in claim 1, wherein the polyethylene resin is a polyethylene having terminal vinyl groups obtained by polymerizing ethylene, or a copolymer having terminal vinyl groups obtained by copolymerizing ethylene and an olefin having 3 or more carbon atoms, the polyethylene or copolymer being obtained by polymerizing ethylene and copolymerizing ethylene with the olefin having 3 or more carbon atoms in the presence of a macromonomer meeting the following requirements:
   (E) a number average molecular weight (Mn) is 2,000 or higher, and
   (F) Mw/Mn is 2-5.

3. The laminate as claimed in claim 1, wherein the polyethylene resin layer has a density of 0.950-0.980 g/cm³.

4. The laminate as claimed in claim 1, wherein the polyethylene resin layer has MFR at 190° C. under a load of 2.16 kg of 30-120 g/10 min.

5. The laminate as claimed in claim 1, having a number of pinholes of 5 or less in visual observation after allowing the laminate to stand under an atmosphere at 135° C. for 30 seconds, applying a methylene blue solution to the laminate and then wiping off the solution.

6. The laminate as claimed in claim 1, wherein the polyethylene resin layer obtained by dipping the laminate in an alkali aqueous solution for 24 hours and then separating the polyethylene resin layer from the laminate has an elongation at break of 30% or less measured under the conditions of sample width: 15 mm and tensile speed: 50 mm/min.

7. Heat-resistant packages, gas-barrier packages, release papers or sheets, photographic support papers, or easy disaggregating moisture-proof papers, using the laminate as claimed in claim 1.

* * * * *